(12) United States Patent
Malbekov

(10) Patent No.: US 12,487,792 B2
(45) Date of Patent: Dec. 2, 2025

(54) MULTIFUNCTIONAL INFORMATION AND COMMUNICATION PLATFORM WITH INTELLIGENT INFORMATION MANAGEMENT

(71) Applicant: Zhanat Malbekov, Almaty (KZ)

(72) Inventor: Zhanat Malbekov, Almaty (KZ)

( * ) Notice: Subject to any disclaimer, the term of this patent is extended or adjusted under 35 U.S.C. 154(b) by 0 days.

(21) Appl. No.: 18/578,756

(22) PCT Filed: Jul. 14, 2021

(86) PCT No.: PCT/KZ2021/000017
§ 371 (c)(1),
(2) Date: Jan. 12, 2024

(87) PCT Pub. No.: WO2023/287270
PCT Pub. Date: Jan. 19, 2023

(65) Prior Publication Data
US 2024/0319954 A1    Sep. 26, 2024

(51) Int. Cl.
*G06F 3/147* (2006.01)
*G09F 9/30* (2006.01)
*G06Q 30/0251* (2023.01)

(52) U.S. Cl.
CPC ............... *G06F 3/147* (2013.01); *G09F 9/30* (2013.01); *G06Q 30/0261* (2013.01)

(58) Field of Classification Search
None
See application file for complete search history.

(56) References Cited

U.S. PATENT DOCUMENTS

2017/0371608 A1* 12/2017 Wasserman ............ G07C 5/008

* cited by examiner

*Primary Examiner* — Omar S Parra

(57) ABSTRACT

The invention relates to the field of automatically collecting, processing, analyzing, classifying, managing, generating, storing, protecting and outputting information. Claimed is a multi-functional information and communication platform with intelligent information control, comprising a central computer and, arranged along the travel path of users, media boards containing devices for collecting, transmitting, receiving and displaying information, digital video controllers, a media board onboard computer, and transceiving devices for wired or wireless communication with the central computer, wherein the platform further comprises devices for detecting radio signals and for recognizing users and their movements (personalization devices), and is a hardware and software system. Devices for displaying information are comprised of multiple sectors, and media boards are joined into clusters.

5 Claims, 5 Drawing Sheets

MULTIFUNCTIONAL INFORMATION AND COMMUNICATION PLATFORM WITH INTELLIGENT INFORMATION MANAGEMENT

FIELD OF THE INVENTION

The invention relates to the field of automated information collecting, processing, analyzing, classifying, managing, generating, storing, protecting, receiving and transmitting.

BACKGROUND OF THE INVENTION

A known intelligent information system (IIS) for a city (Kazakhstan Utility Model Patent No. 3238, published on 22 Oct. 2018, Bul. No. 39) comprises digital video controllers and transmitting and transmitting devices of wired or wireless communication installed on roads and transport lines, as well as a central computer storing the information being transmitted. The system is a hardware-software system for processing video streaming information from a single network platform and a built-in LED monitors structure containing software of analytical functionality of the system for collecting, processing, and transmitting data; the active area of LED monitors is visually divided into navigation, information, and advertising blocks for transmitting a full-value high-quality image of both static and video dynamic content. The information can be placed in both the navigation and information blocks individually in each block or two blocks simultaneously; besides, all three blocks can be used simultaneously. The video controllers include voltage sensors that inform the dispatcher about the lack of power, as well as have the functions of internal climate control and automatic exit to reboot mode when hang-up or loss of network signal and possible parameters of connection to the WLAN with an external antenna, LAN and 3G, 4G, LTE networks, and logging actions.

The disadvantage of the known system is its limited functionality, insufficient volume of the provided information, and the complete absence of orientation on a certain user.

OBJECT AND SUMMARY OF THE INVENTION

The object of the claimed invention is to expand the platform possibilities, increase the capabilities of collecting, processing, and providing information to users, as well as generating relevant information (content) and intelligent management of information for publishing it at the required time and in the right place as personalized for users in a certain information event process, as well as providing more detailed information targeted at a particular user (personification of the information provided).

The implementation of a multifunctional information and communication platform with intelligent information management provides for the construction of an efficient information ecosystem in a megalopolis as one of the components of the Smart City principle; the development of physical, digital, and communication infrastructure in an urban environment for the information support of a city with relevant, up-to-date, and controlled information.

The platform is a single convergent interacting, interpenetrating information ecosystem with distributed tasks; it is a complex hardware and software solution consisting of a network of information display devices combined into a single cluster or multiple clusters controlled by the central computer.

Integration of various hardware and software complexes performs automated generation and intelligent management of current information within a cluster of information display devices based on determining platform functions such as:

A discrete description of a targeted event city information;
Automated generation of information and commercial content;
Intelligent management of information by addressing actual, predicted, or modeled events;
Targeted information support for people and information support for infrastructure facilities;
Adaptive, multi-format, and multi-sectoral information placement in various information systems.

Figure 1:
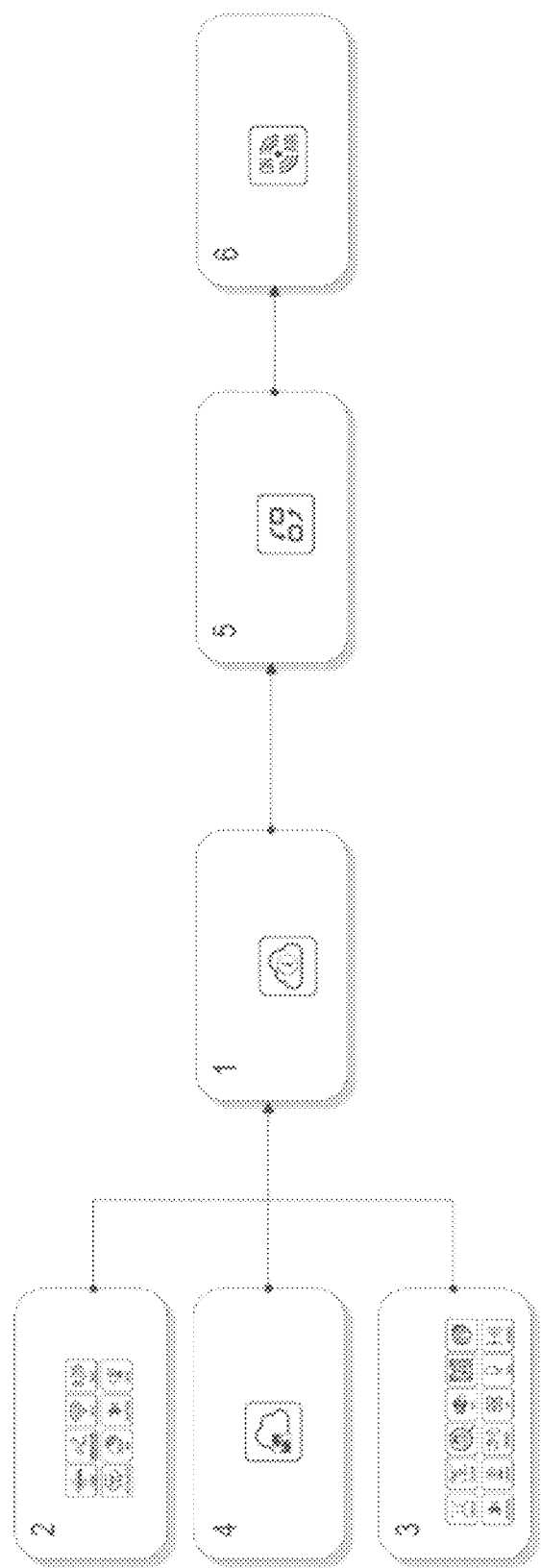
FIG. 1 illustrates an example architecture of a multifunctional information and communication platform configured for intelligent management and regulation within urban spaces.

DESCRIPTION OF THE INVENTION the Platform is an Interactive Media Tool for Urban Space.

Multifunctional and cross-platform technology solutions provide highly efficient communication in the urban space for public convenience. They detect trends in events and make independent decisions to optimize the management and regulation of traffic and pedestrian flows by visual navigation methods.

The platform process solution adds to the infrastructure of the Intelligent City Transport System, in particular, creating a uniform information and communication system that provides for indirect and direct control of traffic flows.

In particular, the main task of the platform in the infrastructure of the Intelligent Transport System is to optimize traffic flows in the urban space through adaptive regulation of vehicles and information interaction with drivers along the way, increasing traffic safety by independent analysis of targeted data with identification of abnormal and incident events for timely, real-time alert of drivers about the current traffic situation in the region and in the direction of travel. The network of mediaboards and information display devices with variable information allows for: navigation orientation and information tracking of drivers and pedestrians in the city; providing information on parking places; informing about the nearest significant objects, street names indicating directions, meteorological data, air quality data, currency rates and other help information.

As an infrastructure addition to ITS, the platform monitors the traffic flow using the onboard analytical systems of the mediaboards. The platform uses reactive and active information processing techniques to support data aggregation, collection, storing and analysis, and predictive and online information modeling.

Processing of data received by the platform devices and received from the outside allows for centralized management of infrastructure entities and provide direct and indirect traffic control in the city. Among other things, they provide:

Vehicle traffic regulation by notifying about changes in the speed limits, displaying the recommended speed limit;

Informing about current situations on the road sections-traffic conditions on the road, category of jams, state of the road (snow, rain, ice); road sections with difficult traffic, detour schemes;

Current information through aggregating data from various analytical equipment, city services, and information services through up-to-date and urgent messages about operational road information, timely warning of emergencies, and priority passage for special transport.

The platform increases road traffic safety by:

Increasing the drivers' attention on dangerous and critical road sections by dynamic information, for example, synchronization of the appearance of the "CAUTION, CHILDREN" signs on the mediaboards with the information on school timetables;

Detecting vehicle movement parameters to account for and ensure complex road safety;

The communicative platform format develops the city visual communication system, provides navigation orientation, and information-cognitive tracking of guests and city residents by broadcasting through the network of pedestrian mediaboards and information display devices the significant and necessary information in several languages, including:

controlled information, for example, for dynamic control of pedestrian traffic.

primary, event, and relevant urban (regional) information for pedestrians, such as street names, closely located objects; taxi and public transport stops; navigation information with estimated route parameters (pedestrian and various types of transportation); urban events and events; relevant and urgent information.

information on accessible communications and services, on-demand and/or in automatic regime.

translation service, on-demand and/or in automatic regime.

Personalized information provided on interactive request, including:

Targeted information support;

Addressing information on interactive requests;

Interaction with a mediaboard devices to receive personalized information and services;

Remote interactive information support and navigation orientation for pedestrians.

In case of detecting abnormal situation and incident events in places of limited space, the platform ensures the safety of people by dynamic informational regulation of pedestrian traffic flow.

In crowded places (tourist areas, cultural-sports venues, public places), the information and communication platform increases the level of safety of city residents and guests in ordinary situations and emergencies, providing, in particular:

in limited spaces, a dynamic information control of pedestrian traffic.

in emergencies, an urgent emergency request through the mediaboard devices.

For that purpose, the claimed multifunctional information and communication platform includes a central computer and various information collection devices (sensors) and devices operating in the optical, acoustic and radio ranges. The information collection and display devices can be independent or combined into stationary units, mediaboards equipped with devices, and mediaboard computers for collecting, primary processing, storage, transmitting to the central computer, and outputting the information content to information display devices. The platform is a hardware and software complex (FIG. 1) consisting of the following complexes:

A programmable equipment complex for the generation and intelligent management of information for displaying of information flows (1);

An analytical equipment complex for information collection and processing (2);

User interaction instrumentation complex (3);

A programmable platform equipment complex for aggregating external data and information (4);

A complex of programmable equipment that makes up the control system architecture and includes media mediaboard computers and the central computer (5);

Information display device complex (6).

The programmable equipment complex includes:

a decision module an event modeling module an event prediction module an automated content generation module an intelligent information management module a module for outputting content to an information display device a telemetry module a client portal an administrative panel, and a database storage.

The programmable equipment complex is designed to receive and process information, generate and self-decide, manage information, and display information content based on aggregation and processing of data coming from other hardware and software components of the platform and received from the outside, and provides intelligent information management based on the processing of multiple received and stored data. The software complex may perform semi-automated and automated media planning, for example, providing maximum advertising campaigns efficiency for advertisers.

Depending on the generation method, the information content of the platform is divided into automatic, semi-automatic, and modified content.

Automated content includes information, widgets, and media messages formed by the programmable equipment complex using methods of automated content construction based on the aggregated information.

Semi-automated content includes information, widgets, and media messages generated manually with the direct support of content-building software complex.

Moderated content includes ready-made information, widgets, and media messages that have undergone selection, negotiation, and adaptation through a moderation service for compliance with the internal requirements of the platform.

The generated information is controlled by predictive modeling and analytical processing based on collecting and processing multiple data, such as, for example, accumulated statistics, real-time event, and incident data, city event data, data on the technical condition of (city) networks, meteorological data, etc., for dynamic control information content.

Publication and placement of content on various information display devices are performed on the basis of intelligent information management algorithms for targeted broadcasting tasks, such as broadcast region, broadcast volume, broadcast period, broadcast frequency, content broadcast information field sector on a display device, targeted contact, and the like, defined by the software complex for each information content on the platform.

The programmable platform equipment complex for aggregation of external data collects and processes external data from information portals (mediaboards and other devices). The used protocol OpenAPI is intended to provide external data reception.

The analytical equipment complex includes a local mediaboard computer, digital cameras with a video analytics function, meteorological sensors (temperature, pressure, humidity, precipitation, air pollution, etc.), transceiver devices with Wi-Fi, Bluetooth, RFID, and NFC radio signal detection function, and radar.

The analytical equipment complex is a hardware and software solution based on various wireless technologies for collecting and processing the variable data used by analytical and interactive systems for automated generation and intelligent management of information and increasing security.

Data collection, processing, and accumulation are performed automatically, continuously over time, online.

Distributed and dispersed analytical equipment complexes making part of the mediaboards continuously automatically detect and identify vehicles, people, and radio-frequency emitting devices in their coverage area.

The analytical equipment complex collects primary incoming information, processes, stores, and transmits it to the central computer and to the software complex for further processing and outputting informational content to the information display device.

In addition to the information processed by the software complex, the information content can contain information received from a central computer and generated based on aggregating and processing data coming from other hardware and software components of the platform, such as the integration complex for aggregating external data, including information output by the operator in manual mode through the central computer, also remotely.

The analytical equipment complex processes the collected information and generates targeted data using artificial intelligence technology. The collected information is processed, filtered, stored, and transmitted to the central computer. Artificial intelligence ensures that only data required for the data system is processed and transmitted while unnecessary information is filtered and discarded.

The platform performs intelligent information management with an indirect personification of actual, predicted and modeled events for efficient and targeted communication based on analytical processing of data and various accumulated statistical data sets, event and incident parameters using mathematical modeling methods. Indirect personification produces a discrete description of actual event processes or predicted events at a particular location and at a certain time, which are relevant to a group of people or one person accidentally located at this time and in this place of the event process. This described event is personalized and relevant only for that group of people (the person). For other groups of people in other times and places, this information is unrelated to their information processes and events, so they are provided with other relevant information.

The analytical equipment complex provides:
Calculating the identified traffic statistics in the effective viewing area.
Calculating the amount of background radio emission signals from communication devices during the content broadcasting to personify the content provided.
Accounting for the total number of contacts for different content on the platform.
Account of the number of IDs re-contacting the platform content.
Accounting of targeted contacts with the platform content.
Registration, accounting, and verification of the electronic device IDs for personalized information support.

The analytical equipment complex generates the following data for fixation (storage) and output to the information display device:
Vehicle flow density;
Average speed rate;
Traffic jam level;
Traffic intensity;
Number of vehicles;
The number of contacts for each content;
Vehicle license plate
Actual vehicle speed;
The date of fixation of each vehicle;
Time of fixation of each vehicle;
Number of MAC addresses of emitting devices;
IDs of electronic devices;
Weather data The information from the analytical equipment obtained and processed by the software complex is outputted to the information display device. Furthermore, the information from an external source, for example, a remote computer connected over a network (wired or wireless), as well as the information inputted by an operator manually, can be outputted to the information display device when necessary.

The user interaction instrumentation complex includes:
1. Speech analyzer unit
2. Wi-Fi sniffer
3. Bluetooth sniffer
4. Facial Recognition Device
5. Human Motion Identification Cameras
6. Optical and radio range devices for identification of vehicles and determination of vehicle movement parameters.
7. Devices for recognizing motion elements and/or user gestures.
8. QR and bar code readers
9. RFID and NFC readers
10. Touchscreen (sensor) panel
11. Quasi-sensor control panel
12. Button (Keyboard) Control device
13. Positive displacement sensor The user interaction instrumentation complex provides direct contact of the system with the targeted audience for personalized information services, interactive information support, and human tracking using various devices and methods for wireless and non-contact technologies.

Methods and means of direct hardware interaction of the platform devices and users are used to personalize information on interactive requests and/or in automatic regime. These methods and means include:
- remote identification methods and means;
- methods and means of short-range contactless identification;
- contact identification methods and means;
- optical biometric identification methods and means;
- acoustic identification methods and means;
- methods and means of identifying kinematic motion;
- contact request methods and means.

Remote (distance) identification is based on the following:
- Detecting BLUETOOTH MAC addresses of emitting devices with remote identification threshold by RSSI signal level
- Detecting WI-FI MAC addresses of emitting devices with remote identification threshold by RSSI signal level
- Absolute geolocation thresholds for a response from user smartphones or communication operators
- Detecting relative geo-positioning of a user's radio-emitting device.

This includes detecting and verifying user device IDs previously registered in the system. As a user approaches a sensor or mediaboard and overcomes the threshold settings for proximity to the platform devices, the nearest mediaboard reacts by providing personalized navigation and information support data according to the tasks previously configured in the system and relevant at that time and location.

The short-range contactless radio-frequency identification is based on the following:
- RFID tags registration
- NFC tags registration
- Registering BLUETOOTH MAC addresses of emitting devices with short-range identification threshold by RSSI signal level
- Registering WI-FI MAC addresses of emitting devices with short-range identification threshold by RSSI signal level The ID of the address is verified by the central computer when the mediaboard device reads the user's RFID tag media (RFID or NFC tickets or cards).

The mediaboard devices then reacts by providing personalized information of navigation-and-information support data according to the tasks previously configured in the system and relevant at that time and location.

Contact identification is based on physical contact for reading ID data from the user's digital media, such as:
- magnetic media on cards
- microchips on user identification documents.

At that, the platform verifies an ID when reading it from the user's digital media. The information display device then reacts by providing personalized information for navigation and information support according to the tasks previously configured in the system and relevant at that time and location.

Optical identification is based on the following:
- Recognition of vehicle license plates and types
- Biometric recognition of faces
- Recognition of QR and bar codes When a user approaches a mediaboard and enters the vehicle license plates' optical capture area, the face biometric identification zone or attaches a QR or barcode to the reader, the parameters of the TS, the user's face, and codes are verified in the system. The nearest mediaboard or the nearest information display devices then react by providing personalized information for navigation and information support according to the tasks previously configured in the platform and relevant at that time and location.

The voice request acoustic identification is based on data from an automatic speech recognition system, methods of converting audio signals into text, and parsing keywords to produce inquiries in the platform devices.

After accessing the mediaboard devices, the user posts a voice inquiry to search for certain information or types of information services via the active surface on the information display device.

Then the information display device responds, in the form of publishing the required, sought after information or providing information services.

Optical identification of human motion kinematics is based on recognizing motion vectors of selected objects (human body or its parts) to control the selection and production of a query for the information sought in the platform browser.

After accessing the mediaboard devices, the search and inquiry for information are managed by movements of the user's body parts or gestures of the fingers and hands.

The result of the response of the information display device is the placement on the device of the required, sought information or the results of information services.

Contact request is based on the following:
Sensor (TOUCHSCREEN) interaction,
Quasi-touch contacting
Tactile contact interaction In this case, the user requests the desired information and digital services on the platform through the active surface of the information display device or the contact interaction sector. Next, the information display device reacts by providing the desired information or rendering digital services.

The user interaction instrumentation complex performs the following types of interaction:
- Providing targeted information on-demand and/or automated;
- Addressing and personification information on interactive requests and/or automated;
- Full and detailed disclosure of raw data in the system upon request and/or automated;
- Request and/or automated provision of personalized information services, including information stored in platform devices;
- Request and provision of emergency assistance through platform devices;
- Request and provision of language translation services;
- Request and provision of information in the targeted view mode on interactive request
- Request and/or automated provision of information on conducting entertaining, informative and production and function events based on the methods of optical identification, biometrics and human movement kinematics;
- Interaction with a mediaboard devices to receive personalized platform services;
- Making personal operations by types of services provided via mediaboards devices (for example, ordering and payment for services, tickets, operations with wireless payment cards etc.);

Remote interactive information support and navigation orientation for pedestrians;

Display personal, information and navigation guidance on mediaboard devices;

Personalized information and navigation support via PUSH notifications on mediaboard devices; and Display controlled information and dynamic control of pedestrian traffic.

A user shall register in the platform devices and determine information support tasks to receive interactive information support.

There are several ways a user can register in the system:

CENTRALIZED registration in the platform is performed during dispensing, issue of documents (passes, tickets, travel tickets, registration cards fitted with QR and bar codes, documents with radio frequency marks, license plate numbers, etc.), and registration of radio-emitting devices with setting platform tasks for information support.

REMOTE registration of a device ID is performed at remote access to the platform, via service applications, with setting tasks for personalized information support of the responses and inquiries.

LOCAL registration is performed via the mediaboard by initiating access to the system through active mediaboard surfaces or remote communication methods, with a personalized selection of information support tasks upon request, followed by registration of the user device ID in the system or recording and verification of the user's biometric data via the mediaboard devices.

Figure 2:
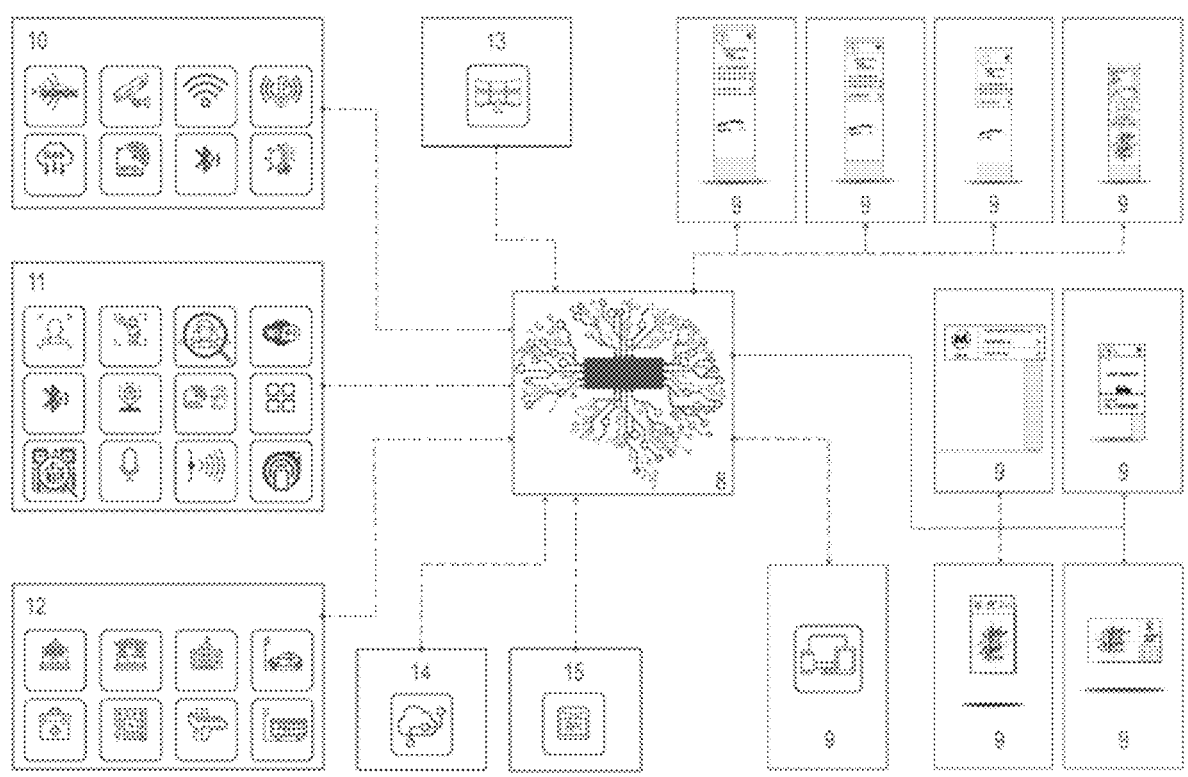
FIG. 2 illustrates an example control system architecture of the multifunctional information and communication platform configured to coordinate operations between a central computer and multiple mediaboard computers.

The programmable equipment complex making up the platform devices' control system architecture (FIG. 2) consists of mediaboard computers (9) and the central (coordinating) computer (8) controlled by the relevant software.

A mediaboard computer makes an integral part of each mediaboard (9). A mediaboard computer is configured to transmit a signal to the mediaboard information display device, monitor the technical condition of the display device equipment, and communicate with the central computer.

The central (coordination) computer is the main processor of the platform. The central computer performs intelligent information generation and control on mediaboard computers, collects and processes information from various external information flows coming, in particular, from:

The analytical equipment complex (10);

The user interaction instrumentation (11);

Municipal services (12);

Event center (13);

Online services (14);

Open API (15).

The information display device equipment complex is a finite platform element that translates generated and dispersed information content. The information display devices include:

Variable message signs (VMS);

Visual displays of dynamic information (VDDI);

Digital video screens of various formats, designs, and functional purposes;

Media facades of buildings and structures of various configurations and solutions;

Television, industrial, and professional display devices of various sizes and formats;

Information mediaboards of various formats.

Information display devices may include one or more fields (blocks) for displaying various content. Platform processing solutions may provide certain broadcast formats for various types of information display devices.

Figure 3:
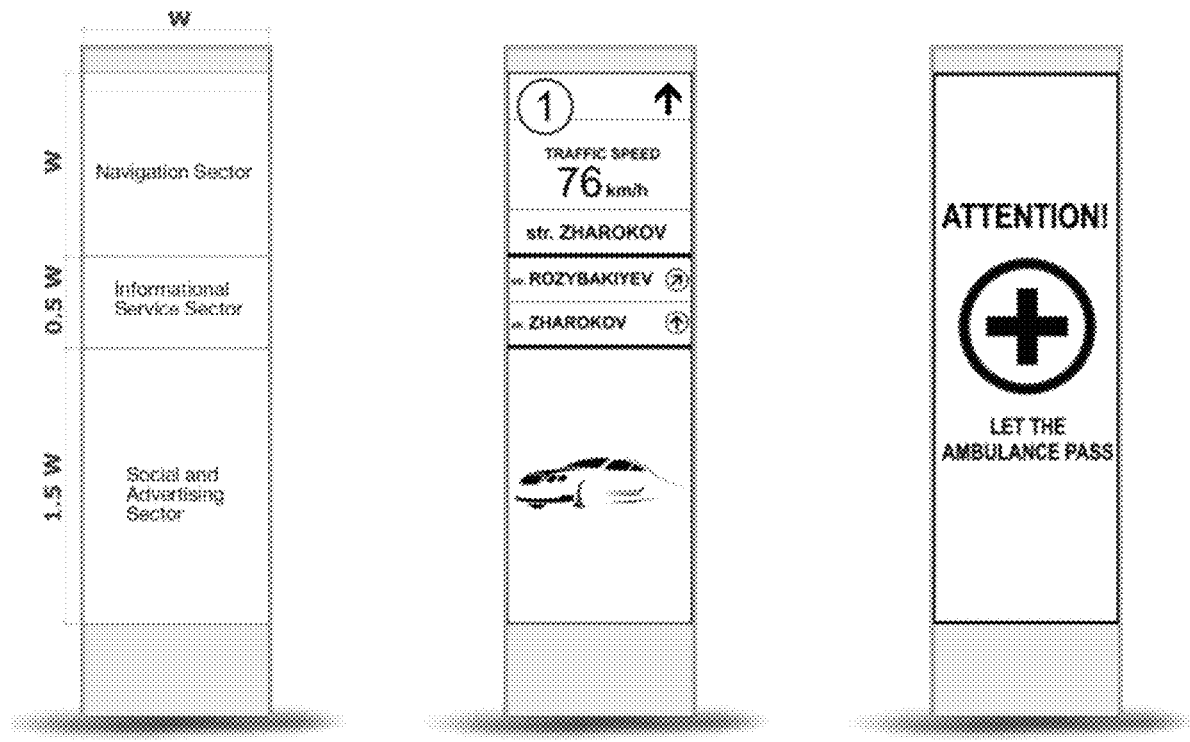
FIG. 3 illustrates an example configuration of a multi-sector information display device having multiple information sectors integrated on a single mediaboard surface.

The platform's information display devices are based on equipment and standards for single-sector and multi-sectoral broadcast formats to ensure the high quality and efficiency of information broadcasting. The multi-sector format equipment includes such information complexes as vertical roadside structures of highway, road, street, and pedestrian mediaboards, which contain several, for example, three information sectors on one surface (FIG. 3):

Navigation sector;

Service information sector;

Sector for social and commercial information.

Figure 4:
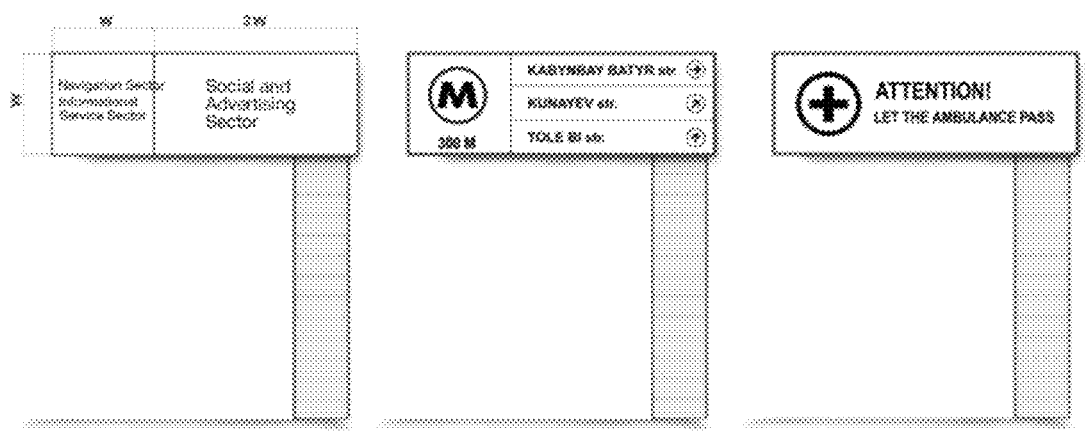
FIG. 4 illustrates an example configuration of a horizontal roadside mediaboard structure including two information sectors arranged on a single mediaboard surface.
Figure 5:
FIG. 5 illustrates an example configuration of a multi-sector information display device divided into two information sectors on a single mediaboard surface.

Horizontal roadside mediaboard structures (FIG. 4) and multi-sector information display device structures (FIG. 5) may be divided, for example, into two information sectors on one surface:

Navigation and service information sector;

Sector for social and commercial information.

Information can be displayed in navigation, information, and commercial areas separately or in two or more sectors at a time with partial or complete engagement of all sectors. For example, when drivers are alerted about the need to give way to special transport (an ambulance), etc., utilizing the entire information surface of the mediaboard. In this case, the platform determines the priority of information content for broadcasting based on its relevance as specified or set by the platform.

Methods for the dynamic changing of dimensions of broadcast areas can be applied to emphasize and draw attention to relevant information on a multi-sectoral information surface.

Figure 6:
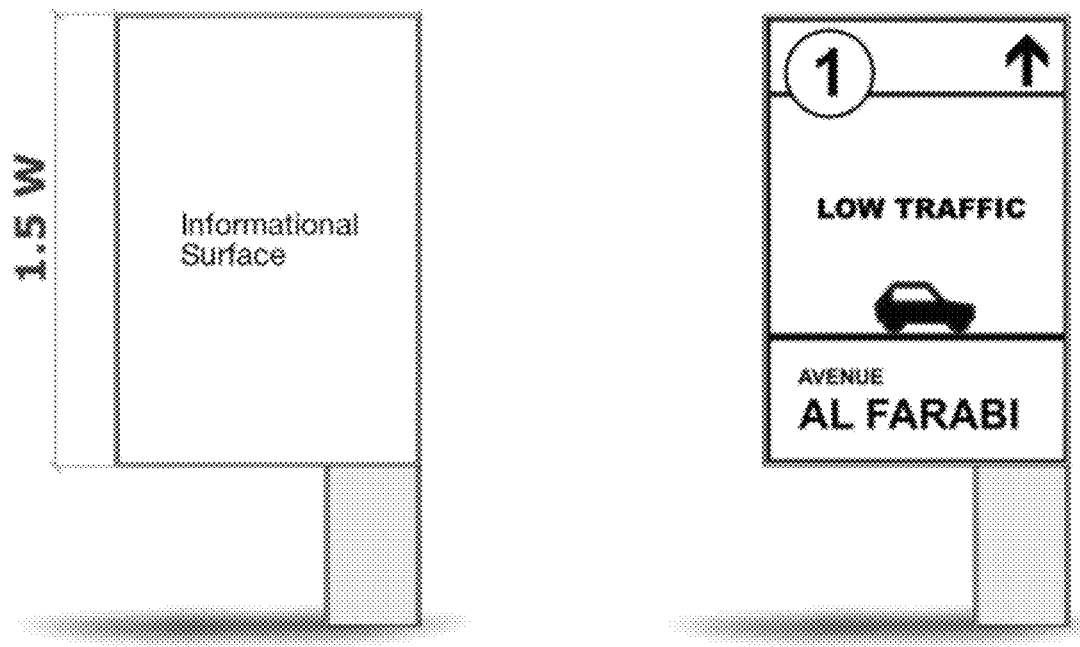
FIG. 6 illustrates an example configuration of a single-sector mediaboard structure utilizing the entire display surface as a unified information space.

The single-sector format includes single-sector structures with the entire information surface of mediaboards as one information space (FIG. 6, 8).

The platform devices control the priority and sequential broadcast of the content on the single-sector information surface using adaptive calculation algorithms, increasing the efficiency of information perception.

The intelligent information and communication platform operates as follows.

When a vehicle enters the coverage area of a mediaboard radar, digital camera or optical sensors, the analytical equipment complex captures and generates the raw data of the number of vehicles and speed of each vehicle on the mediaboard computer in the autonomous mode, indicating the vehicle license number and the time when the car passed by. The raw data is then processed and stored on the central computer to form the analytical database and further control the information and its display on the information display devices.

When user radio-emitting devices (RFID, NFC, electronic gadgets, such as smartphones, smart watches, cars fitted with onboard radio-emitting devices, such as Bluetooth, Wi-Fi, RFID, etc.) enter the coverage area of the mediaboard analytical equipment complex transceivers, they are detected. The raw data on the number of radio-emitting devices and their signal level is generated, indicating the unique device identification number (MAC address) and time. The central computer processes and stores this raw data to generate analytical data and parameters and manage the information on the information display devices.

When a user approaches a mediaboard and the user's device ID signal and/or location data from the media board's devices crosses the threshold settings, the user's previously registered devices are detected and verified, or the user's initial registration is performed.

In the area of optical detection of vehicle license plates, biometric facial identification, or when the mediaboard devices read passive RF tags, QRs, bar codes on wearable documents or radio-emitting device IDs, the transport IDs, user biometric parameters and user ID codes registered on the platform are identified and verified, or the user's initial registration is performed.

The nearest mediaboard or information display device then reacts by providing personalized information, navigation-and-information support relevant for that time and location according to the tasks previously configured in the system.

The programmable platform equipment for aggregating external data requests and receives data independently. This processed data is a part of integrated information generation for display on the platform terminals.

Figure 7:
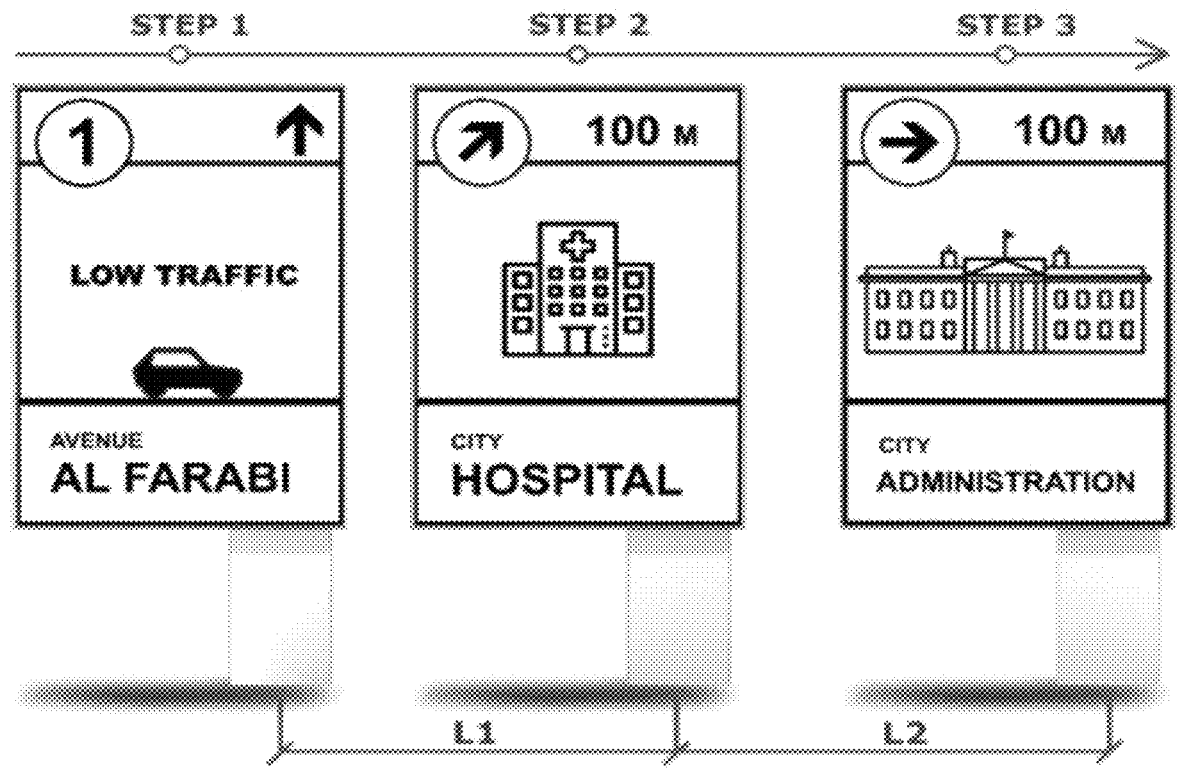
FIG. 7 illustrates a group of single-sector mediaboards configured to operate as a single local information space for coordinated display of sequential informational content across multiple structures.

For groups of mediaboards with one information sector combined into a single local information space, techniques for simultaneous placement and adaptive movement of priority information in a cluster of mediaboards are applied (FIG. 7) according to the formula t=L/V, where t is the time of movement of the content, L is the distance between the mediaboards, and V is the speed of the content movement.

Figure 8:
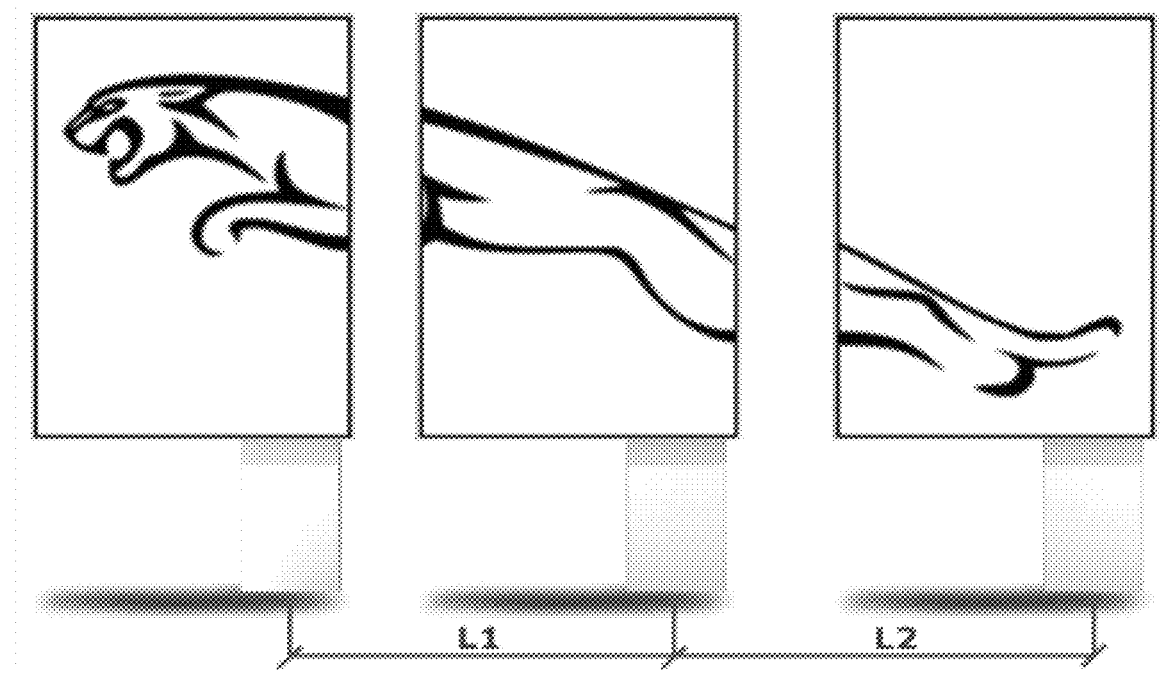
FIG. 8 illustrates a series of single-sector mediaboards sequentially arranged to collectively form a continuous dynamic visual display.

The algorithms for sequential information publishing on a cluster's information display devices are applied (FIG. 8) according to the formula T=L1/V+L2/V+Ln/V, where T is the content publishing time, L1, L2, and Ln indicate the distance between the mediaboards, and V is the speed of the user movement from one information display device to another depending on changes in conditions.

The anamorphosis and parametric techniques (FIG. 8) are also applied to form an integral perception of information content distributed across multiple information display devices in a cluster.

The content and algorithms of information content depend on changes in the traffic situation and event changes in the city space under content tasks for targeted information support and user information support.

Multifunctional and cross-platform technological solutions of the claimed platform are integrated into the urban physical, digital, and communication infrastructure and serve its development in the context of the "Smart City" concept.

It is clear that the application of the claimed multifunctional information and communication platform with intelligent information management is not limited by use in urban infrastructure. The multifunctional information and communication platform provides applied solutions for different sectors, like Smart Field (ensuring safety at oil and gas fields), Smart Gas Station (solution for fuel stations), Smart Subway (Intelligent transport systems infrastructure), Smart Hub (logistic zones), Smart Venue (tourist complexes, sports entertainment objects, shopping centers), and others.

Technological solutions of the platform for industrial facilities can improve the efficiency of managing technological processes through their complete automation and efficient interaction of the system with the participants in production processes.

Platform communication efficiency is achieved by personalized and directive interaction of the platform with each participant in the production process by means of, for example, visual communication in a convenient and adaptive information perception format. The use of the platform in the industrial area infrastructure provides:

Highly efficient provision with actual, operative, and adaptive online information in the facility infrastructure;
Improved occupational and labor safety;
Dynamic information control of people traffic in danger areas;
Operational response to emergencies;
Instrumental security to ensure complex safety based on targeted data analysis in the platform, primarily to detect emergencies and incidents in production areas for adaptive notification and increased people safety;
Automation of personnel and vehicle route orientation dispatching system;
Automated control of vehicle traffic;
Navigation support for vehicle drivers;
Dynamic notification of changes in the technological process.

In logistic zones, information processing and display equipment and algorithms may be used to organize the movement of cargo and transport within the terminal. The complex firmware solution includes a multifunctional information and communication platform with intelligent information management based on personalized routing and a complex of interactive information display devices, for example, LED panels for dynamic visual tracking and controlling the movement of mobile objects in the Terminal area. This solution can provide transport and cargo identification, tracking and regulation of traffic, regulation of technological processes, personalized information support of mobile objects, operative correction of routes, and a dynamic visual navigation system.

As a technical result, using the proposed multifunctional information and communication platform with intelligent information management increases the capacity and volume of information collected, processed, and provided to the users. The platform provides more detailed and customized information targeted to the user (personification of information provided).

What is claimed is:

1. A multifunctional information and communication platform with intelligent information management, wherein the platform comprises:
    a central computer;
    at least one stationary mediaboard comprising a local mediaboard computer, wherein each of the at least one stationary mediaboard is associated with a display device to enable publication and placement of content based on intelligent information management algorithms for providing targeted broadcasting, wherein:
        each of the display device comprises of multiple sectors; and
        at least two display devices of at least two stationary mediaboards are joined into clusters; and
    digital video controllers, configured to dynamically adjust content dimensions across the multiple sectors and enable adaptive content movement between clustered display devices, wherein:
        the local mediaboard computers are configured to operate in an autonomous mode, wherein the local mediaboard computers are configured to collect external data comprising information that comprises:
            data obtained by detection of radio signals;
            data associated with recognition of vehicle and users; and
            data associated with identification of movements of the identified vehicles and users; and
        the platform is a hardware-software complex comprising:
            a user interaction instrumentation for collecting external data wherein, the user interaction instrumentation comprises:

identification sensors for identifying vehicles and determining movement parameters associated with the vehicle;

human motion identification cameras, to obtain information by identifying human movement and to recognize motion element and/or user gestures;

speech analyzer unit and a facial recognition device for automatic speech recognition and face recognition respectively;

touch screen panels, quasi sensor control panel, button (keyboard) control device and/or positive displacement sensor to obtain the external data; and WiFi sniffers and/or Bluetooth sniffers;

a programmable platform equipment configured to aggregate the external data;

an analytical equipment complex to enable analytical processing of the collected external data;

a set of programmable equipment complex that makes up an architecture of a platform equipment control system and includes the central computer and the at least one stationary mediaboard; and an information display device equipment complex configured to display the data generated by the analytical equipment complex on the display device associated with each of the at least one stationary mediaboard.

2. A method for intelligent information management using the multifunctional information and communication platform according to claim 1, comprising collecting, processing, storing, and transmitting data from the analytical equipment complex to a central computer, for processing, automatic generation and intelligent management of information, with a further output on the at least one information display device wherein the information comprises:

user location;

traffic conditions in the region and in the direction of travel of the user;

the closest objects of interest;

possible variants of reaching the objects of interest;

meteorological data for the user's location;

data pertaining to emergencies, that are regional and in the immediate vicinity of the user, wherein the information about the user is additionally received from the detection sensors and the human motion identification cameras for recognition, identification and movement of users, wherein the platform is configured to perform an interaction with the user to generate personalized information and services by the platform, either upon receiving a request and/or generate the personalized information and services automatically.

3. The method of intelligent information management using the multifunctional information and communication according to claim 2, wherein it further comprises registration of a user in the platform.

4. The method of intelligent information management using the multifunctional information and communication according to claim 2, wherein the platform performs automated construction of information content and its output to the information display devices.

5. The method of intelligent information management using the multifunctional information and communication according to claim 2, wherein it comprises simultaneous placing and adaptive moving of priority personalized information requested by a user through the platform information display devices.

* * * * *